United States Patent
Motoyama

(10) Patent No.: US 9,442,685 B2
(45) Date of Patent: Sep. 13, 2016

(54) CONTROL METHOD OF A PRINTER, A PRINTER, AND A PRINTING SYSTEM

(71) Applicant: Seiko Epson Corporation, Tokyo (JP)

(72) Inventor: Hiroyuki Motoyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/600,361

(22) Filed: Jan. 20, 2015

(65) Prior Publication Data
US 2015/0205556 A1   Jul. 23, 2015

(30) Foreign Application Priority Data

Jan. 17, 2014  (JP) ................................ 2014-006769
Sep. 18, 2014  (JP) ................................ 2014-189613

(51) Int. Cl.
*H04N 1/04* (2006.01)
*G06F 3/12* (2006.01)

(52) U.S. Cl.
CPC .............. *G06F 3/1274* (2013.01); *G06F 3/121* (2013.01); *G06F 3/1234* (2013.01); *G06F 3/1259* (2013.01); *G06F 2206/1514* (2013.01)

(58) Field of Classification Search
CPC .... G06F 3/121; G06F 3/1274; G06F 3/1259; G06F 3/1234; G06F 2206/1514
USPC ........................................ 358/1.14, 1.9, 1.15
See application file for complete search history.

(56) References Cited

U.S. PATENT DOCUMENTS 7,158,243 B2 *  1/2007  Sakamoto ............... G06F 3/126 358/1.1
2004/0218204 A1  11/2004  Nomura

FOREIGN PATENT DOCUMENTS

| JP | 2003-303060 A | 10/2003 |
| JP | 2004-130784 A | 4/2004 |
| JP | 2006-123318 A | 5/2006 |

* cited by examiner

*Primary Examiner* — Houshang Safaipour
(74) *Attorney, Agent, or Firm* — Nutter McClennon & Fish LLP

(57) ABSTRACT

A printer, a control method of a printer, and a control system enable a printer to efficiently inform a control device that cancelling a print job was instructed by operation of an operating unit. The printer detects if a cancel button was operated, stores button operation information indicating if the cancel button was operated based on the detection result, and if a status response request is received from a host computer, adds and returns button operation information in status information indicating the requested status.

10 Claims, 5 Drawing Sheets

CONTROL METHOD OF A PRINTER, A
PRINTER, AND A PRINTING SYSTEM

Priority is claimed under 35 U.S.C. §119 to Japanese Application No. 2014-189613 filed on Sep. 18, 2014, and Japanese Application No. 2014-006769 filed on Jan. 17, 2104, which are hereby incorporated by reference in their entireties.

BACKGROUND

1. Technical Field

The present disclosure relates to a method of controlling a printer that prints, a printer, and a printing system.

2. Related Art

Control systems in which a control device (host device) and a printing device (printer) communicate, and the printer prints as controlled by the control device, are known. See, for example, JP-A-2006-123318. Printers that have an operating unit operated by the user to cancel a print job, and cancel a print job in progress when the operating unit is operated, are also known.

There is a need in such printing devices that can cancel a print job in response to operation of an operating unit to efficiently inform the control device that the operating unit was operated.

SUMMARY

An objective of at least one embodiment of the present invention is to provide a control method of a printer, a printer, and a printing system that enables a printer to efficiently inform a control device that cancelling a print job was instructed by an operation of an operating unit.

One aspect of at least one embodiment of the present invention is a control method of a printer that can connect to a control device, including: printing based on a print job created by the control device; detecting if an operating unit that receives a print job cancel command was operated; storing operation information indicating if the operating unit was operated based on the detection result; and adding the operation information to status information indicating a status and responding to the control device if a status response request is received from the control device.

Thus comprised, when a status response request is received, the printer adds operation information to the status information that is returned. As a result, the control method of at least one embodiment of the present invention enables more efficient notification using status information than a configuration that uses a proprietary protocol for sending operation information from the printer to the control device, and reports cancellation of a print job by sending the operation information according to the proprietary protocol.

A control method according to another aspect of at least one embodiment of the present invention also includes receiving from the control device a reset command that sets the operation information to information indicating that the operating unit has not been operated; and when the operation information is information indicating that the operating unit was operated, setting the operation information to information indicating the operating unit has not been operated.

Thus comprised, the printer can reset the operation information to information indicating that the operating unit has not been operated in response to a command from the control device.

Another aspect of at least one embodiment of the present invention is a printer that can connect to a control device, the printer including: a print unit that prints based on a print job created by the control device; an operating unit that receives a print job cancel command; and a control unit that detects if the operating unit was operated, stores information indicating if the operating unit was operated based on the detection result, and adds the operation information to status information indicating a status and responds to the control device if a status response request is received from the control device.

Thus comprised, when a status response request is received, the printer adds operation information to the status information that is returned. As a result, the printer of at least one embodiment of the present invention can send notifications more efficiently using status information than a configuration that uses a proprietary protocol for sending operation information from the printer to the control device, and reports cancellation of a print job by sending the operation information according to the proprietary protocol.

Further, preferably in a printer according to another aspect of at least one embodiment of the present invention, when a reset command that sets the operation information to information indicating that the operating unit has not been operated is received from the control device and the operation information is information indicating the operating unit was operated, the control unit sets the operation information to information indicating the operating unit has not been operated.

Thus comprised, the printer can reset the operation information to information indicating that the operating unit has not been operated in response to a command from the control device.

Another aspect of at least one embodiment of the present invention is a printing system including a printer and a control device connected to the printer, wherein: the printer comprises a print unit that prints based on a print job, an operating unit for instructing cancelling a print job, and a control unit that detects if the operating unit was operated, stores information indicating if the operating unit was operated based on the detection result, and adds the operation information to status information indicating a status and responds to the control device if a status response request is received from the control device; and the control device comprises a host control unit that creates the print job, sends control data for the created print job to the printer, and controls the printer to execute the print job, and sends a status response request to the printer, and cancels a print job queued for execution by the printer when the operation information added to the status information received in response to the response request is information indicating the operating unit has not been operated.

Thus comprised, when a status response request is received, the printer adds operation information to the status information that is returned. As a result, the printing system of at least one embodiment of the present invention can send notifications more efficiently using status information than a configuration that uses a proprietary protocol for sending operation information from the printer to the control device, and reports cancellation of a print job by sending the operation information according to the proprietary protocol.

In addition, when the operating unit of the printer is operated, the control device detects operation of the operating unit based on the operation information added to the status information, and cancels print jobs queued for printing by the printer. As a result, when the control device creates and queues multiple print jobs, the user can cancel any print jobs that remain queued for the printer by simply operating the operating unit once instead of operating the operating unit for each individual print job to cancel. The user's task is thereby simplified, and user convenience is improved.

In a printing system according to another aspect of at least one embodiment of the present invention, the host control unit of the control device can send a reset command that sets the operation information to information indicating the operating unit has not been operated; and the control unit of the printer sets the operation information to information indicating the operating unit has not been operated when the reset command is received from the control device and the operation information is information indicating the operating unit was operated.

Thus comprised, the control device can reliably reset the operation information to information indicating the operating unit has not been operated by sending a reset command.

In a printing system according to another aspect of at least one embodiment of the present invention, the host control unit of the control device receives print requests requesting printing by the printer, and when a print request is received, sends the reset command to the printer before sending control data for the print job based on the print request to the printer.

Thus comprised, because the operation information is reset to information indicating that the operating unit has not been operated by the control device sending a reset command before starting to print with the printer, problems such as operation information indicating that the operating unit was operated being sent from the printer to the control device and the print job being cancelled by the control device even though the operating unit was not operated while printing can be prevented.

In a printing system according to another aspect of at least one embodiment of the present invention, the host control unit of the control device receives print requests requesting printing by the printer, creates a plurality of print jobs for printing based on the print request when a print request is received, sequentially executes the plural print jobs on the printer by sending control data for the next print job to the printer after one print job ends, sends a status response request while sequentially executing the print jobs, and cancels the print jobs that have not been executed by the printer if the operation information added to the status information received in response to the status response request while sequentially executing the print jobs is information indicating the operating unit was operated.

Thus comprised, if a series of print jobs based on a print request are queued and the operating unit is operated while the printer is executing any one of the print jobs, the control device can cancel the queued print jobs that have not been executed.

In a printing system according to another aspect of at least one embodiment of the present invention, the host control unit of the control device sends the status response request before sending control data for any one of the plural print jobs to the printer.

Thus comprised, the control device can detect if the operating unit was operated before executing a print job on the printer, and if the operating unit was operated, can cancel the print job before starting the print job.

Further preferably, the print request requests printing plural pages; and the host control unit of the control device creates a print job for each page.

Thus comprised, when the operating unit is operated while the printer is executing the print job for any one of multiple pages based on a print request, the control device can cancel the print jobs for the pages that have not been printed.

Other objects and attainments together with a fuller understanding of the invention will become apparent and appreciated by referring to the following description and claims taken in conjunction with the accompanying drawings.

DESCRIPTION OF EMBODIMENTS

Some embodiments of the present invention are described below with reference to the accompanying figures.

Figure 1A:
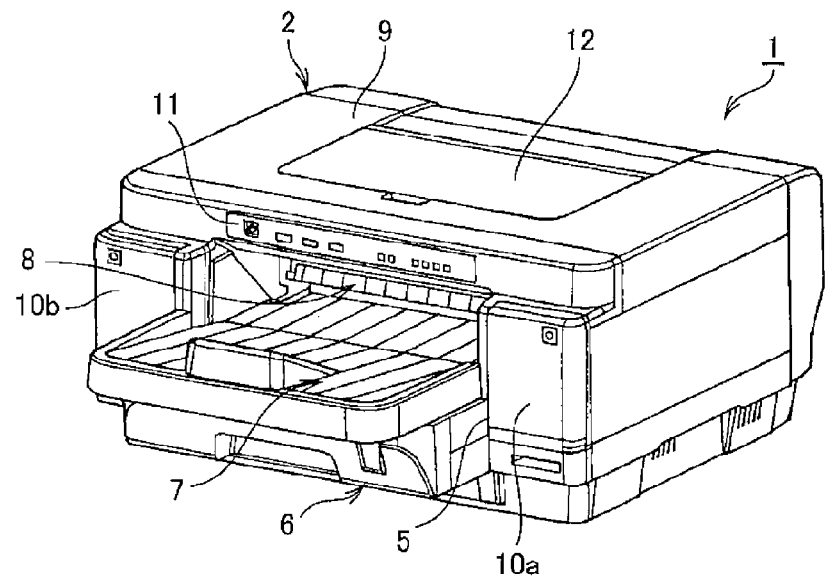
FIG. 1A is an oblique view of a printer according to some embodiments of the invention.

FIG. 1A is an oblique view from the front of a printer 1 according to some embodiments of the present invention.

The printer 1 can be a serial inkjet printer. The printer 1 loads cut-sheet print media (such as A4 paper), and prints images on the loaded print media. The printer 1 can have an inkjet head that can be is mounted on a carriage. The carriage scans in a primary scanning direction intersecting the conveyance direction of the print medium. The printer 1 prints images by driving the carriage to scan the primary scanning direction with the inkjet head while ejecting ink at a specific timing from specific nozzles of the inkjet head and forming dots of specific colors on the print medium.

As shown in FIG. 1A, the printer 1 has a rectangular box-like printer unit 2 that extends in a length direction is long across the width of the printer 1. A paper cassette loading unit 5 is assembled inside the printer unit 2. A paper cassette 6 can be removably installed in the paper cassette loading unit 5. The paper cassette 6 is a box-shaped member that can hold multiple sheets of print media for supply to the printer 1. A discharge tray 7 is disposed above the paper cassette 6. The discharge tray 7 is a tray that temporarily holds the print media after being printed. A paper exit 8 from which the print media is discharged after printing is disposed above the discharge tray 7.

Rectangular access doors 10a, 10b are disposed on opposite sides of the discharge tray 7 and paper exit 8 at the front of the case 9 of the printer unit 2. When the user opens these access doors 10a, 10b, the ink cartridge loading units thereinside are exposed and the ink cartridges can be replaced.

An openable cover 12 is disposed on the top of the case 9. Opening the cover 12 exposes the inside of the case 9, and makes accessible the mechanisms housed in the case 9.

An operating panel 11 is disposed on the front of the case 9 above the paper exit 8.

Figure 1B:
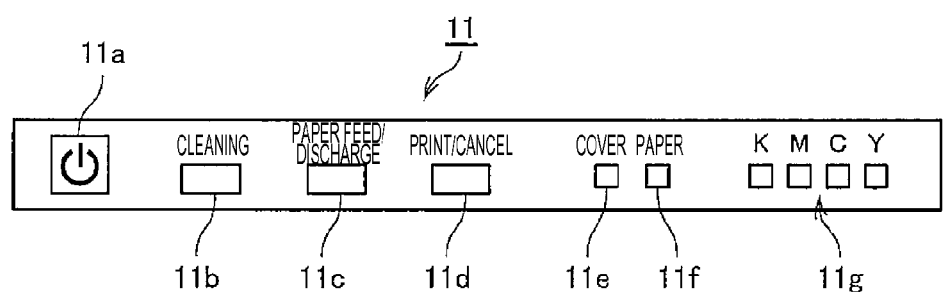
FIG. 1B illustrates the operating panel on the printer.

As shown in FIG. 1B, a power button 11a for turning the power on and off is disposed at the left end of the operating panel 11. A cleaning button 11b for starting the inkjet head cleaning operation is disposed on the operating panel 11 on the right side of the power button 11a. A paper feed/discharge button 11c for feeding the print media stored in the paper cassette 6 or discharging the print media from the paper exit 8 is disposed on the operating panel 11 on the right side of the cleaning button 11*b*. A cancel button 11*d* (operating unit) that accepts a command to cancel a print job in progress is disposed on the operating panel 11 on the right side of the paper feed/discharge button 11*c*. The process executed by the printer 1 and the host computer 30 described below (FIG. 2) when the cancel button 11*d* is operated is described further below. A first warning indicator 11*e*, which is an LED indicating the status of the cover 12, is disposed on the operating panel 11 on the right side of the cancel button 11*d*. A second warning indicator 11*f*, which is an LED indicating the status of the print media set in the printer 1, is disposed on the operating panel 11 on the right side of the first warning indicator 11*e*. A third warning indicator 11*g*, which is a group of LEDs indicating the status of ink in the ink cartridges holding black (K), magenta (M), cyan (C), and yellow (Y) ink, is disposed on the right side of the second warning indicator 11*f*.

Figure 2:
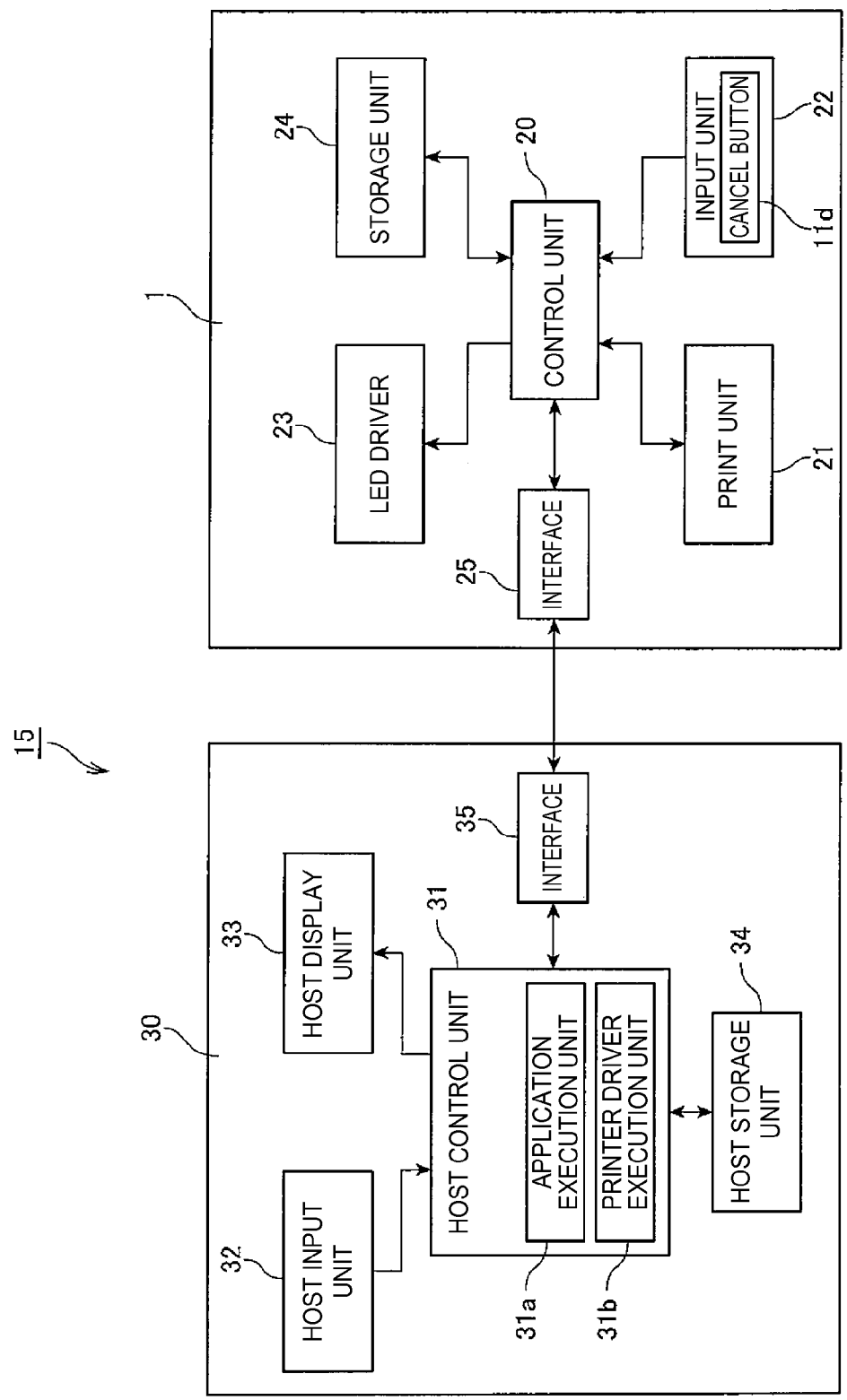
FIG. 2 is a block diagram illustrating the functional configuration of the control system.

FIG. 2 is a block diagram illustrating the functional configuration of the control system 15 according to some embodiments of the present invention.

The control system 15 includes the printer 1 and a host computer 30 (control device), which are communicatively connected to each other.

As shown in FIG. 2, the printer 1 includes a control unit 20, print unit 21, input unit 22, LED driver 23, storage unit 24, and communication interface 25.

The control unit 20 includes a CPU, ROM, RAM, and other peripheral circuits, and controls the printer 1. The control unit 20 controls the printer 1 by functions of a control program, including firmware, for example.

In addition to the inkjet head and carriage described above, the print unit 21 includes a mechanism for conveying the print media, various sensors, and the mechanisms, devices, and parts needed for other printing-related processes and processes associated with printing. The print unit 21 prints images on the print media as controlled by the control unit 20.

The input unit 22 detects operation of the buttons, including the cancel button 11*d* described above, and outputs to the control unit 20.

The LED driver 23 drives the LEDs of the first warning indicator 11*e*, second warning indicator 11*f*, and third warning indicator 11*g* as controlled by the control unit 20.

The storage unit 24 includes nonvolatile memory, and stores data. A button flag area that stores a button flag, which is set when the cancel button 11*d* is operated, is formed as a 1-bit button flag area that can be read by the firmware in the storage area of the storage unit 24. The button flag area is a storage area storing a button flag that is set when the cancel button 11*d* is operated. After the button flag is set in response to operation of the cancel button 11*d*, the flag remains set until the printer 1 receives a reset command described below. Therefore, by referencing the state of this button flag, the control unit 20 can know whether or not the cancel button 11*d* was operated. Information indicating whether or not the cancel button 11*d* was operated, which is indicated by the button flag, is also referred to as "button operation information" below.

Note that setting the button flag as used herein means setting the button flag to 1. Clearing the button flag means setting the button flag to 0.

The communication interface 25 communicates with the host computer 30 according to a specific communication protocol as controlled by the control unit 20. The communication standard is not specifically limited, and may be a communication standard compatible with USB, a communication standard compatible with RS232-C or other serial port interface standard, or a communication standard compatible with Ethernet (T), for example.

As shown in FIG. 2, the host computer 30 includes a host control unit 31 (control device control unit), a host input unit 32, host display unit 33, host storage unit 34, and host communication interface 35.

The host control unit 31 includes a CPU, ROM, RAM, and other peripheral circuits, and controls the host computer 30. Function blocks of the host control unit 31 includes an application execution unit 31*a* and a printer driver execution unit 31*b*. These function blocks are described further below.

The host input unit 32 connects to an input means such as a mouse, keyboard, button, or switch, detects operation of the input means, and outputs to the host control unit 31.

The host display unit 33 has a display panel such as an LCD panel, and displays images on the display panel as controlled by the host control unit 31.

The host storage unit 34 is nonvolatile memory and stores data.

The host communication interface 35 communicates with the printer 1 according to a specific communication protocol as controlled by the host control unit 31.

As described above, the printer 1 has a operating panel 11 (operating unit). The operation of the printer 1 related to the cancel button 11*d* is described below.

Figure 3:
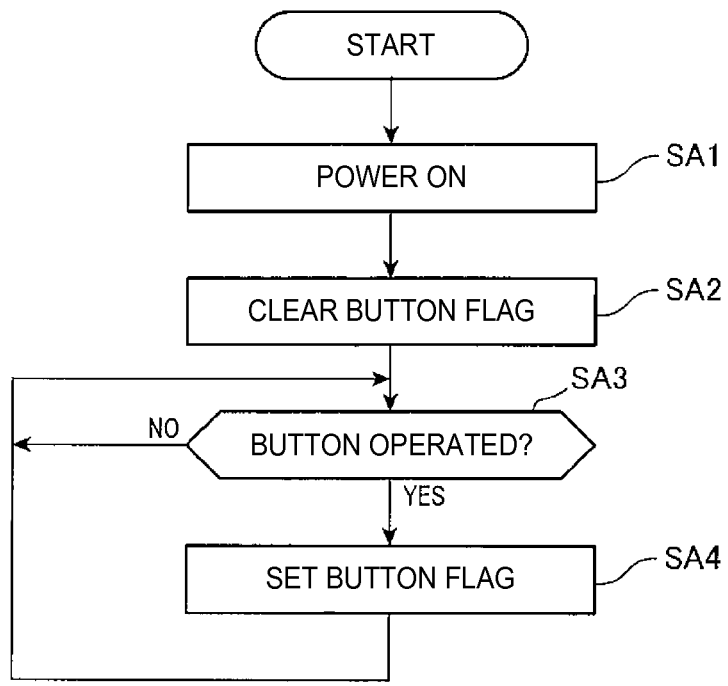
FIG. 3 is a flow chart of printer operation.

FIG. 3 is a flow chart illustrating the operation of the printer 1.

The control unit 20 of the printer 1 reads and executes the process show in the flow chart in FIG. 3 from firmware or associated programs.

As shown in FIG. 3, when the printer 1 power turns on (step SA1), the control unit 20 of the printer 1 clears the button flag (step SA2).

As shown in FIG. 3, the control unit 20 of the printer 1 monitors whether or not the cancel button 11*d* is operated while the power is on (step SA3).

If operation of the cancel button 11*d* is detected (step SA3 returns YES), the control unit 20 sets the button flag (step SA4). Note that in step SA4 the control unit 20 accesses the button flag area and sets the button flag. If the button flag has already been set, the control unit 20 simply keeps the button flag set.

As long as the printer 1 power is on (power on state), the control unit 20 of the printer 1 according to this embodiment monitors whether or not the cancel button 11*d* is operated. If the cancel button 11*d* is operated, the control unit 20 sets the button flag.

Note that the control unit 20 executes the operation of steps SA3 and SA4 in the flow chart in FIG. 3 in parallel to the process shown in column (B) in the flow chart in FIG. 4 described below. The control unit 20 therefore sets the button flag if the cancel button 11*d* is operated while the process shown in (B) in the flow chart in FIG. 4 is executing as described below.

Operation of the printer 1 and the host computer 30 when the printer 1 prints is described next.

Figure 4:
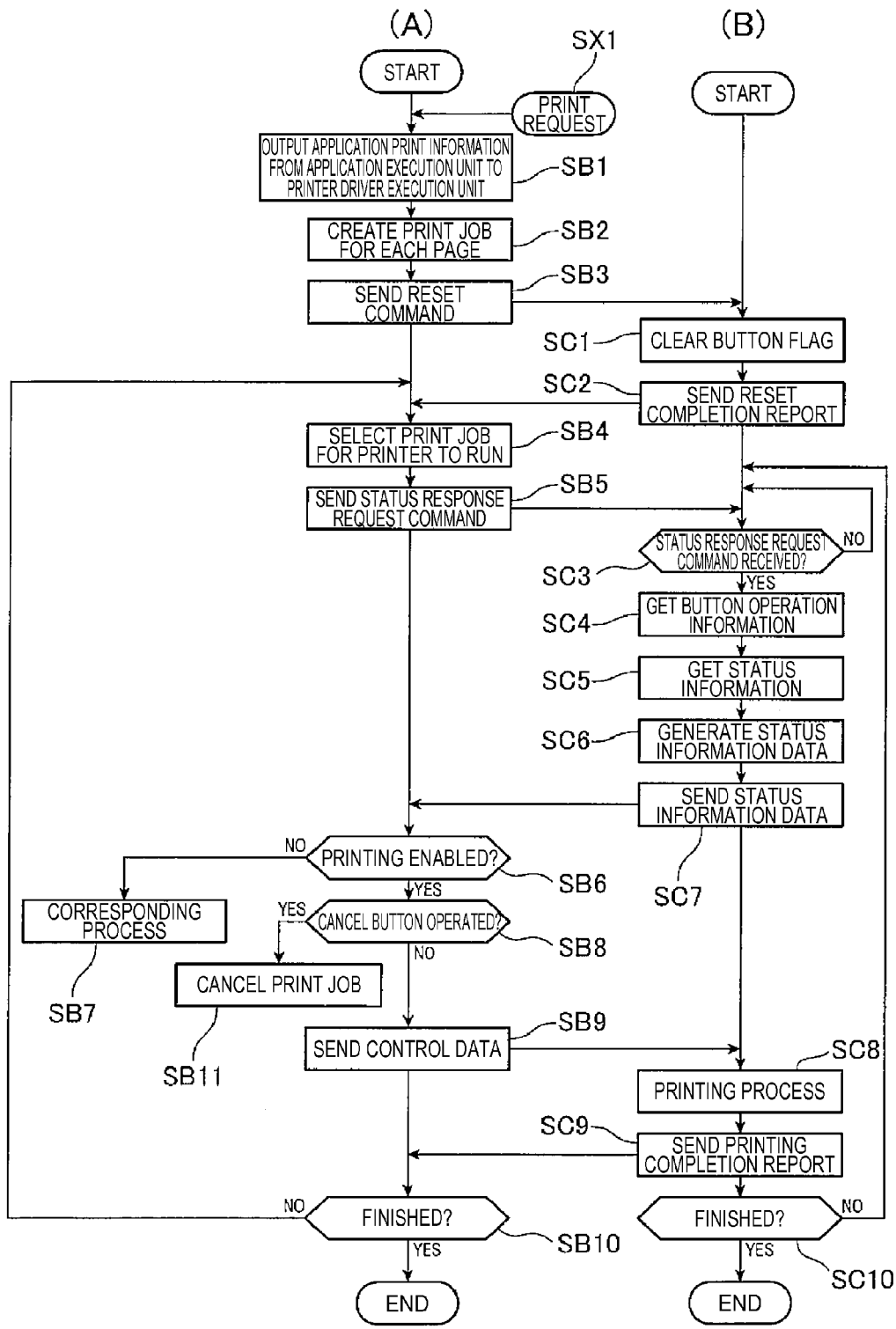
FIG. 4 is a flow chart of host computer and printer operation.

FIG. 4 is a flow chart showing the operation of the printer 1 and the host computer 30, column (A) showing the operation of the printer 1, and column (B) showing the operation of the host computer 30.

When the flow chart in FIG. 4 starts, a specific application (program) installed on the host computer 30 starts. The application can be software such as a word processor, spreadsheet, web browser, or other program that displays images on the display panel of the host display unit 33, and accepts commands to print an image corresponding to the imaged presented on the display panel. These two functions are not limited to being performed independently by a single application, and may be embodied using an operating system (OS), a printer driver described below, and other software.

To print with the printer 1, the user uses a user interface provided by the application to issue a print request (step SX1). A print request means requesting the printer 1 to print.

In this example the application is a word processing program, and in step SX1 the user requests printing 10 pages. Printing one page means printing an image on one sheet of paper. Therefore, an instruction to print 10 pages means an instruction to print images on ten sheets of paper. The printer driver generates a print job for each page.

A print job means a job corresponding to a continuous printing sequence executed by the printer 1 as controlled by the host computer 30. The control unit 20 and the printer 1 execute a printing process for each print job. Therefore, when the number of pages to print is 10 and a print job is created for each page (when 10 print jobs corresponding to the 10 pages are created), the host computer 30 sends control data for printing each page, and when printing one page based on the control data is completed, creates control data for printing the next page.

If the number of pages to print is 10 and one print job is created for the 10 pages (when one print job corresponding to the 10 pages is created), the host computer 30 sends the control data instructing printing one page continuously for the 10 pages, and the printer 1 sequentially prints the individual pages based on the control data to print the 10 pages one after another.

The effect of creating plural print jobs corresponding to the plural pages to be printed is described below.

More specifically, as will become understood below, the host computer 30 controls the printer 1 to sequentially print plural print jobs one at a time. As a result, the user can check the print media on which an image is printed one sheet at a time to confirm the printed result. Therefore, the user can know early in the printing process if the printed result is not what the user expected. For example, when the user requests printing images on 10 sheets of print media, the user can know when printing the image on the first sheet of print media whether the printed result differs from the expected result. If the printed result differs from what was expected, the user can cancel printing by operating the cancel button 11d on the printer 1. Because the user can know at an early state in the printing process if the result is as desired, the user can cancel printing at an early stage and can thereby reduce the waste of print media. Note that the control system 15 according to this embodiment simplifies user operation and improves user convenience related to instructing cancel printing as described further below.

If the host computer 30 is configured to create one print job to print images on plural sheets of print media and control the printer 1 to print the one print job when printing plural sheets of print media is requested, the following can occur.

That is, in this configuration, because the printer 1 continuously prints images on plural sheets of print media when executing a single print job, processing is efficient and the time required to complete the process can be shortened. On the other hand, printing an image on plural sheets of print media runs continuously. As a result, the user may not be able to determine that the printed result differs from the expected result early in the process of printing images on the plural sheets of print media.

As shown in column (A) of FIG. 4, when a print request is asserted, the application execution unit 31a of the host control unit 31 of the host computer 30 outputs the information required for printing (referred to below as "application print information") to the printer driver execution unit 31b (step SB1).

The application execution unit 31a and printer driver execution unit 31b are function blocks that executes processes by reading and running an application and associated programs.

In step SB1, the application execution unit 31a calls an API (application programming interface) provided by the OS, and using functions of the API outputs the application print information to the printer driver execution unit 31b.

Based on the input application print information, the printer driver execution unit 31b creates a print job for each page (step SB2). In this example, the printer driver execution unit 31b creates 10 print jobs for the 10 pages to be printed.

After creating the plural print jobs in step SB2, the printer driver execution unit 31b sends a reset command to the printer 1 (step SB3).

This reset command is a command instructing clearing the button flag.

As shown in column (B) of FIG. 4, the control unit 20 of the printer 1 clears the button flag in response to receiving the reset command (step SC1). More specifically, if the button operation information is information indicating that the cancel button 11d was operated (already operated), the control unit 20 changes the button operation information in step SC1 in response to receiving the reset command to indicate that the cancel button 11d has not been operated (not operated). Note that if the button flag is not set, the control unit 20 does not change the flag setting in step SC1 and the button flag remains unset.

Next, the control unit 20 sends a reset completion report reporting that the flag was cleared to the control unit 20 (step SC2).

Next, the control unit 20 checks if the status response request command described below was received (step SC3).

As shown in column (A) of FIG. 4, the printer driver execution unit 31b of the host control unit 31 of the host computer 30 executes the following process when the reset completion report is received.

First, the printer driver execution unit 31b selects the print job for the printer 1 to execute from among the plural print jobs created in step SB2 (step SB4).

More specifically, when plural print jobs are created, the printer driver execution unit 31b controls the printer 1 to sequentially execute the print jobs. In step SB4, the printer driver execution unit 31b selects the next print job for the printer 1 to execute according to the print job sequence.

For example, if no print job has been completed, the printer driver execution unit 31b selects the print job related to printing an image on the first sheet of print media in step SB4. If the print jobs related to printing images on the first five pages of print media have already been completed, the printer driver execution unit 31b selects the print job for printing the sixth page of the print media in step SB4.

Below, the print job the printer driver execution unit 31b selects in step SB4 is referred to as the target print job.

Next, the printer driver execution unit 31b sends a status response request command to the printer 1 (step SB5). The printer driver execution unit 31b in this embodiment thus sends the status response request command after selecting the target print job and before sending control data for processing the target print job.

The status response request command is a command requesting the printer 1 to return status information data. This status information data is data including status information indicating one or more statuses of the printer 1. These statuses include, for example, the state of the cover 12, if various errors have occurred, and the remaining ink level.

Button operation information indicating the state of the button flag is also included in the status information data. The button operation information may be represented by a particular flag in the status information data, for example. Further alternatively, the button operation information may be expressed by storing data indicating the state of the button flag in a specific area reserved in the status information data.

Figure 5:
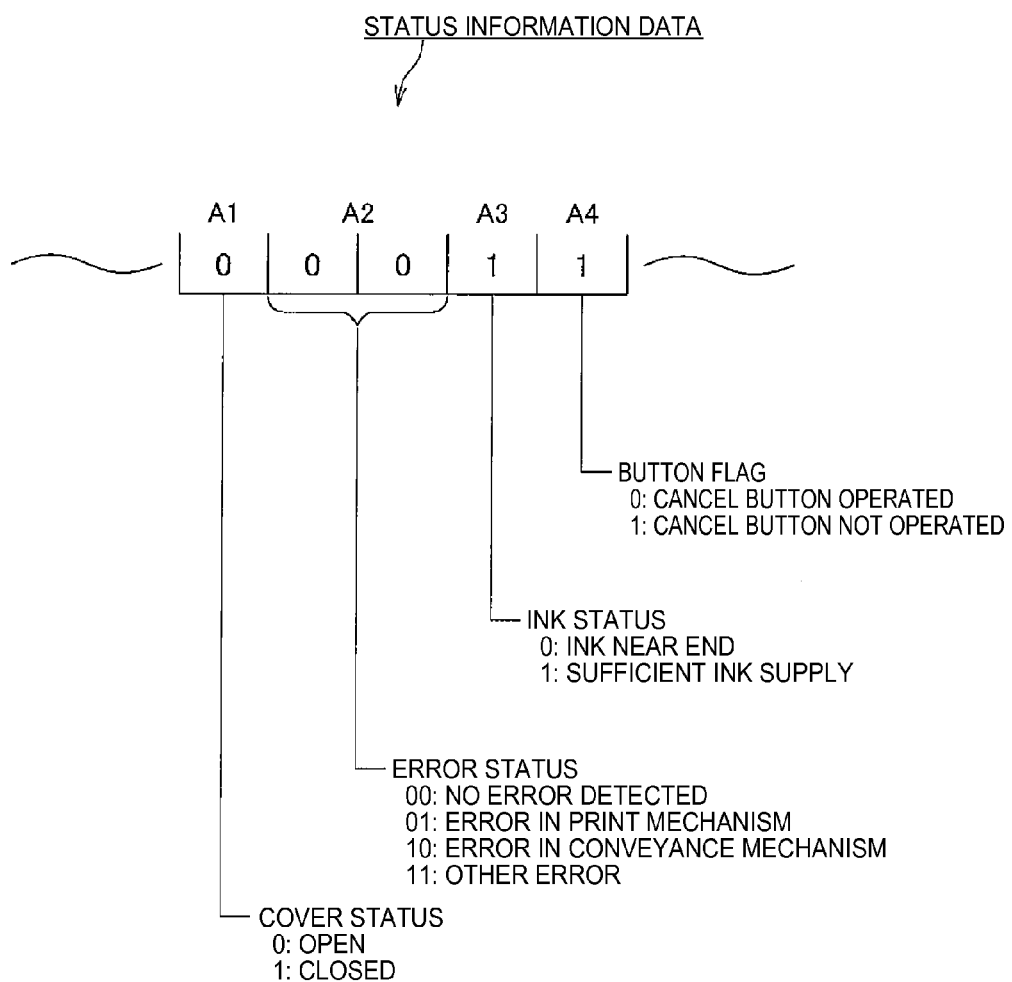
FIG. 5 illustrates status data.

FIG. 5 shows an example of the status information data.

As shown in FIG. 5, the status information data has a 1-bit area A1. This area A1 is an area where information indicating the status of the cover 12 is set. Setting this area A1 to a 1 indicates that the cover 12 is open; setting it to 0 indicates the cover 12 is closed.

The status information data also has a printer unit 2-bit area A2. This area A2 is an area where information related to various errors is stored. Setting area A2 to 00 means that no error has occurred. Setting area A2 to 01 means that an error has occurred in the print mechanism. Setting area A2 to 10 means that an error has occurred in the conveyance mechanism. Setting area A2 to 11 means that another error has occurred.

The status information data also has a 1-bit area A3. This area A3 is an area where information related to the remaining ink level is set. When area A3 is set to 0, the ink end is near. When area A3 is set to 1, there is sufficient ink.

The status information data also has a 1-bit area A4. This area A4 is the area where the button flag is stored. More specifically, area A4 stores a 1 indicating the cancel button 11d was operated, or a 0 indicating the cancel button 11d has not been operated.

As shown in column (B) of FIG. 4, when the status response request command is received (step SC3 returns YES), the control unit 20 of the printer 1 reads the state of the button flag and gets the button operation information (step SC4). If the button flag is set (set state), the button operation information is information indicating that the cancel button 11d was operated. If the button flag is not set, the button operation information is information indicating that the cancel button 11d has not been operated.

Next, the control unit 20 gets the values of various sensors, gets specific statuses by executing processes acquiring specific statuses, and acquires the status information based on the acquired statuses (step SC5).

Next, the control unit 20 generates status information data including the button operation information acquired in step SC4 and the status information acquired in step SC5 (step SC6). In other words, the status information data is data created by adding the button operation information to the status information.

Next, the control unit 20 sends the generated status information data (step SC7).

As shown in column (A) of FIG. 4, when the status information data is received, the printer driver execution unit 31b of the host control unit 31 of the host computer 30 executes the following process (step SB6).

Based on the status information contained in the status information data, the printer driver execution unit 31b determines whether the printer 1 is in a state that enables the execution of the printing process. In step SB6, the printer driver execution unit 31b determines that the printing process cannot be executed in the current state of the printer 1 if the cover 12 is open, a specific error has occurred, or there is insufficient remaining ink, for example.

If the printer 1 cannot execute the printing process in its current state (step SB6 returns NO), the printer driver execution unit 31b executes an appropriate process (step SB7).

In step SB7, the printer driver execution unit 31b interrupts execution of the print job by the printer 1, and controls the host display unit 33 to display that the printer 1 cannot print and the cause, for example.

If the state of the printer 1 enables the execution of the printing process (step SB6 returns YES), the printer driver execution unit 31b executes the following process (step SB8).

Specifically, the printer driver execution unit 31b determines if the cancel button 11d was operated based on the button operation information contained in the status information data. If the button flag is set in the printer 1, the printer driver execution unit 31b determines that the cancel button 11d was operated in step SB8. If the button flag is not set in the printer 1, the printer driver execution unit 31b determines that the cancel button 11d was not operated in step SB8.

The printer driver execution unit 31b may determine in step SB8 that the cancel button 11d was operated in the following situations, for example.

For example, the printer driver execution unit 31b may determine that the cancel button 11d was operated when starting the print job related to the printing of the first page of print media if the cancel button 11d was operated after the button flag was cleared based on the reset command sent in step SB3 and before the status response request command was sent in step SB5.

The printer driver execution unit 31b may also determine that the cancel button 11d was operated when starting the print job related to the printing of the fifth page of print media if the cancel button 11d was operated while executing the print job related to the printing of the fourth page of print media.

The process described in steps SA3 and SA4 in the flow chart in FIG. 3 is also executed while running a print job.

If it is determined in step SB8 that the cancel button 11d was not operated (step SB8 returns NO), the printer driver execution unit 31b executes the following process.

The printer driver execution unit 31b generates control data comprising the commands controlling the sequence of steps appropriate to the target print job, and sends the control data to the printer 1 (step SB9).

As shown in column (B) of FIG. 4, when the control unit 20 of the printer 1 receives the control data, it controls the print unit 21 based on the control data to print an image on the print medium (step SC8). In this example, the control unit 20 prints an image on the first sheet of the print medium in step SC8. When printing the image is completed, the control unit 20 sends a printing completed report indicating that the printing of the image based on the print job was completed to the host computer 30 (step SC9). Next, the control unit 20 determines whether all print jobs created in step SB2 have been completed (step SC10). The control data that the host computer 30 sends in step SB9 includes information indicating whether the control data is for the last print job, and based on this information the control unit 20 determines if printing is completed in step SC10.

If all print jobs are completed (step SC10 returns YES), the control unit 20 ends the process. If all print jobs are not completed (step SC10 returns NO), the control unit 20 returns to step SC3.

As shown in column (A) of FIG. 4, when the printing completed report is received, the printer driver execution unit 31b of the host control unit 31 of the host computer 30 executes the following process.

The printer driver execution unit 31b determines if all print jobs created in step SB2 have finished (step SB10). If all print jobs created in step SB2 have finished (step SB10 returns YES), the printer driver execution unit 31b ends the process. If all print jobs created in step SB2 have not finished (step SB10 returns NO), the printer driver execution unit 31b returns to step SB4.

However, if it is determined in step SB8 that the cancel button 11d was operated (step SB8 returns YES), the printer driver execution unit 31b executes the following process (step SB11). Specifically, the printer driver execution unit 31b in step SB11 cancels any print job created in step SB2 that has still not be executed by the printer 1 (print jobs still queued for execution by the printer 1). This means that generating and sending control data for the print jobs is cancelled, and the printer 1 is not caused to execute another print job.

Executing the process of step SB11 has the following effect.

For example, when the user requests printing images on 10 sheets of print media as described in the foregoing embodiment of the present invention, the user may look at the result of printing the first page of the printed print media and determine that the printed result differs from what was expected. After printing the image on the first sheet of print media is completed, the user then operates the cancel button 11d while the print job related to printing an image on the second sheet of print media is executing.

As a result, the printer driver execution unit 31b sends the status response request command in step SB5 before sending control data for the print job related to printing an image on the third sheet of print media.

The button operation information contained in the status information data that the printer driver execution unit 31b receives in response to the status response request command is information indicating that the cancel button 11d was operated because the cancel button 11d was operated while the immediately preceding print job was running. The printer driver execution unit 31b therefore determines in step SB8 that the cancel button 11d was operated, and in step SB11 cancels the print jobs that have still not executed.

By operating the cancel button 11d once, the user can therefore cancel the print jobs related to printing the third to tenth sheets of print media.

Note that when the user requests printing on multiple sheets of print media and the user cancels the print job in the middle of printing, the intention is often to also cancel printing images on the remaining pages that have not finished printing.

To cancel plural print jobs in the related art, however, the user must typically operate the cancel button 11d for each print job to cancel each of the print jobs. For example, to cancel printing on the third to tenth sheets of print media, the user must operate the cancel button 11d eight times and cancel the eight print jobs. In comparison, the control system 15 according to some embodiments of the present invention reduces the number of operations required by the user, and therefore improves user convenience.

As described above, the control system 15 according to some embodiments of the present invention has a printer 1 and a host computer 30 (control device).

The printer 1 includes a print unit 21 that prints; a cancel button 11d (operating button) that receives a command to cancel a print job the print unit 21 is executing; and a control unit 20 that detects whether the cancel button 11d was operated, stores button operation information as information indicating whether or not the cancel button 11d was operated based on the detection result, and if a response request for status data is received from the host computer 30, adds the button operation information to the status information indicating the status and responds to the host computer 30.

The host computer 30 has a host control unit 31 (control device control unit) that creates a print job, sends control data for the created print job to the printer 1, controls the printer 1 to execute the created print job, requests the printer 1 to return status data, and cancels a print job queued for the printer 1 if the button operation information added to the status information received in response to the response request is information indicating the operating button was operated.

Thus, some embodiments of the present invention enable more efficient notification using status information than a configuration that uses a proprietary protocol for sending button operation information from the printer 1 to the host computer 30, and reports cancellation of a print job by sending the button operation information according to the proprietary protocol.

Furthermore, when the cancel button 11d of the printer 1 is operated in at least one embodiment of the present invention, the host computer 30 detects that the cancel button 11d was operated based on the button operation information added to the status information, and therefore cancels print jobs that were queued for execution by the printer 1. As a result, when the host computer 30 creates and queues multiple print jobs, the user can cancel any print jobs that remain queued for the printer 1 to execute by simply operating the cancel button 11d once instead of operating the cancel button 11d for each individual print job to cancel. The user's task is thereby simplified, and user convenience is improved.

In some embodiments of the present invention the host control unit 31 of the host computer 30 can send a reset command instructing resetting of the button operation information. When this reset command is received from the host computer 30, and the button operation information is information indicating that the cancel button 11d was operated, the control unit 20 of the printer 1 changes the button operation information to indicate that the cancel button 11d has not been operated.

The button operation information is information indicating that the cancel button 11d was operated when the button flag is set and information indicating that the cancel button 11d was not operated when the button flag is cleared.

Thus comprised, the host computer 30 can reliably reset the button operation information to information indicating that the operating button has not been operated by simply sending the reset command.

In some embodiments of the present invention, the host control unit 31 of the host computer 30 receives print requests requesting the printer 1 to print, and when a print request is received, sends a reset command to the printer 1 before controlling the printer 1 to execute control data for the print job based on the print request.

This embodiment can therefore prevent problems such as button operation information indicating that the cancel button 11d was operated from being sent from the printer 1 to the host computer 30 and the print job being cancelled by the host computer 30 even though the cancel button 11d has not been operated while printing.

In some embodiments of the present invention, the host control unit 31 of the host computer 30 receives print requests requesting the printer 1 to print, and when a print request is received, creates plural print jobs for printing based on the print request, sends the control data for the next print job to the printer 1 after one print job ends, and thereby controls the printer 1 to sequentially print plural print jobs. When the host control unit 31 sends a status response request while running plural print jobs, and the button operation information added to the status information received in response to the status response request is information indicating that the operating button was operated, the host control unit 31 cancels any remaining plural print jobs that have not been executed by the printer 1.

Thus comprised, if a series of print jobs based on a print request are queued and the cancel button 11d is operated while the printer 1 is executing any one of the print jobs, the host computer 30 can cancel the queued print jobs that have not been executed.

Furthermore, when multiple print jobs are queued, the host control unit 31 of the host computer 30 sends a status response request to the printer 1 before sending the control data for any single print job.

Thus comprised, the host computer 30 can detect if the cancel button 11d was operated before executing a print job on the printer 1, and if the cancel button 11d was operated, can cancel the print job before starting the print job.

The print request of a user in some embodiments of the present invention is a request to print multiple pages. The host control unit 31 of the host computer 30 creates a print job for each page.

Thus comprised, when the cancel button 11d is operated while the printer 1 is executing the print job for any one of the multiple pages based on the print request, the host computer 30 can cancel the print jobs for the pages that have not been printed.

The present invention is described above with reference to some embodiments thereof, but the present invention is not limited thereto and can be modified and adapted in many ways without departing from the scope of the accompanying claims.

For example, the printer 1 may have plural operating modes, and be configured to execute the process described above when the active operating mode is a specific operating mode. This can also be applied to the host computer 30.

The function blocks shown in FIG. 2 can be achieved by the cooperation of hardware and software. [PLEASE MAKE SURE THAT THIS "HARDWARE" AND "SOFTWARE" corresponding to any claimed functional blocks (e.g., operating unit, control unit, host control unit, print unit, control device, etc.) are clearly disclosed in the specification. This may be necessary to satisfy 35 U.S.C. 112(f).] The function of the printer 1 may also be handled by a separate device externally connected to the printer 1. The printer 1 may also execute processes by running a program stored in an externally connected storage medium.

The disclosure being thus described, it will be apparent that it may be varied in many ways. Such variations are not to be regarded as a departure from the spirit and scope of the disclosure, and all such modifications as would be apparent to one skilled in the art are intended to be included within the scope of the following claims.

What is claimed is:

1. A control method of a printer configured to connect to a control device, comprising:
    detecting an operation to an input unit;
    storing operation information based on a detected operation until at least receiving a status response request from the control device;
    acquiring a status by a sensor in the printer; generating status information by adding the operation information to the status;
    sending the status information when the status response request is received from the control device; and
    printing a print job received from the control device when sending the status information not included the operation information to the control device; and sending the status information before receiving the print job.

2. The control method described in claim 1, further comprising:
    receiving from the control device a reset command that sets the operation information to information indicating that the input unit is not operated; and
    when the operation information is information indicating the input unit is operated, setting the operation information to information indicating that the input unit is not operated.

3. A printer configured to connect to a control device, comprising:
    an input unit configured to detect an operation;
    a sensor configured to detect a printer situation;
    a controller configured to store operation information based on a detected operation until at least receiving a status response request from the control device, acquire a status from the sensor, and send status information to the control device when the status response request is received from the control device; and
    a printing mechanism configured to print a print job received from the control device when the controller sends the status information not included the operation information to the control device;
    wherein:
    the controller sends the status information before receiving the print job from the control device.

4. The printer described in claim 3, wherein:
    when a reset command that sets the operation information to information indicating the input unit is not operated is received from the control device and the operation information is information indicating that the input unit is operated, the control unit sets the operation information to information indicating that the input unit is not operated.

5. A printing system including a printer and a control device connected to the printer, wherein:
    the printer comprises
    an input unit configured to detect an operation,
    a sensor configured to detect a printer situation,
    a controller that stores operation information based on a detected operation until at least receiving a status response request from the control device, acquires a status from the sensor, and sends status information to the control device when the status response request is received from the control device, and
    a printing mechanism configured to print a print job received from the control device when the controller sends status information not included in the operation information to the control device;
    wherein:
    the controller sends the status information before receiving the print job from the control device; and the control device comprises a host controller configured to send the status response request to the printer, receive the status from the printer, create the print job, and send the created print job to the printer, wherein;

the host controller creates and sends the printer job when receiving the status information not included the operation information from the printer, and the host controller cancels the printer job when receiving the status information included in the operation information from the printer before sending the printer job.

6. The printing system described in claim 5, wherein:

when receiving the status information not included the in operation information from the printer, the host controller of the control device can send a reset command that sets the operation information to information indicating that the input unit is not operated; and the controller of the printer sets the operation information to information indicating that the input unit is not operated when the reset command is received from the control device and the operation information is information indicating that the input unit is operated.

7. The printing system described in claim 6, wherein:

before the host controller of the control device sends the print job to the printer, the reset command is sent to the printer.

8. The printing system described in claim 5, wherein:

when receiving the status information not included the operation information from the printer, the host controller creates a plurality of print jobs, sequentially sends the next print job to the printer after one print job ends, and cancels the next print job while sequentially sending the print jobs when receiving the status information included the operation information from the printer.

9. The printing system described in claim 8, wherein:

the host controller of the control device sends the status response request before sending any one of the plural print jobs to the printer.

10. The printing system described in claim 8, wherein:

the print job includes printing plural pages; and a host control unit of the control device creates a print job for each page.

\* \* \* \* \*